United States Patent [19]
Scherer

[11] Patent Number: 6,039,343
[45] Date of Patent: Mar. 21, 2000

[54] AIR BAG COVER WITH HORN SWITCH

[75] Inventor: David F. Scherer, Ortonville, Mich.

[73] Assignee: TRW Vehicle Safety Systems Inc., Lyndhurst, Ohio

[21] Appl. No.: 08/996,659

[22] Filed: Dec. 23, 1997

[51] Int. Cl.[7] ............................. B60R 21/16; H01H 9/00
[52] U.S. Cl. ...................................... 280/731; 200/61.54
[58] Field of Search ................................. 280/731, 728.3; 200/61.54

[56] References Cited

U.S. PATENT DOCUMENTS

| | | | |
|---|---|---|---|
| 5,413,376 | 5/1995 | Filion et al. | 280/728.3 |
| 5,449,197 | 9/1995 | Kerner | 280/731 |
| 5,465,998 | 11/1995 | Davis | 280/731 |
| 5,577,767 | 11/1996 | Nemoto | 280/731 |
| 5,585,606 | 12/1996 | Ricks | 280/735 |
| 5,684,283 | 11/1997 | Hambleton, Jr. et al. | 280/731 |
| 5,685,560 | 11/1997 | Sugiyama et al. | 280/731 |
| 5,698,828 | 12/1997 | Perkins | 200/61.54 |
| 5,723,834 | 3/1998 | Hambleton, Jr. et al. | 280/731 |
| 5,725,241 | 3/1998 | Schenk | 280/731 |
| 5,836,609 | 11/1998 | Coleman | 280/728.3 |
| 5,908,203 | 6/1999 | Peterson | 280/728.3 |
| 5,934,702 | 8/1999 | Coleman | 280/731 |
| 5,947,512 | 9/1999 | Magoteaux et al. | 280/731 |
| 5,964,477 | 10/1999 | Lehman | 280/728.3 |

*Primary Examiner*—Paul N. Dickson
*Assistant Examiner*—Michael Britton
*Attorney, Agent, or Firm*—Tarolli, Sundheim, Covell, Tummino & Szabo L.L.P.

[57] ABSTRACT

An Apparatus (10) including a switch assembly (130) in an electric circuit for actuating an electrically actuatable device (132). The switch assembly (130) includes a first switch member (140) underlying a first cover portion (100) and a second switch member (142) underlying a second cover portion (110). At least one of the first and second switch members (140, 142) is movable with the at least one of the first and second cover portions (100, 110). The second switch member (142) has a predetermined weakened portion (160) underlying the second cover portion (110). The first cover portion (100) is manually engageable to operate the first switch member (140), and the second cover portion (110) is manually engageable to operate the second switch member (142). The switch assembly (130) includes a non-rupturing connector member (182) extending across a tear seam (92) and electrically interconnecting the first switch member (140) and the second switch member (142). The connector member (182) is connected with the second switch member (142) adjacent to the predetermined weakened portion (160). The predetermined weakened portion (160) is rupturable due to force applied by the connector member (182) upon inflation of the inflatable device (44).

10 Claims, 3 Drawing Sheets

AIR BAG COVER WITH HORN SWITCH

BACKGROUND OF THE INVENTION

1. Technical Field

The present invention relates to a switch for mounting on a portion of a vehicle as part of a vehicle safety apparatus. In particular, the present invention relates to a horn switch that is part of an air bag module mounted on a vehicle steering wheel.

2. Description of the Prior Art

It is known to mount an air bag module on a steering wheel of a vehicle to help protect the driver of the vehicle. The air bag module includes an air bag and an inflator. In the event of sudden vehicle deceleration of a magnitude which requires protection of the driver, the inflator is actuated to inflate the air bag into a position to help protect the driver of the vehicle.

It is known to provide a horn switch that is operable by pressing on a cover of an air bag module mounted on a vehicle steering wheel. U.S. Pat. No. 5,585,606 discloses a membrane type horn switch which is connected with an air bag module cover. The horn switch includes two active parts, each located on a respective movable part of the cover. A rupturable portion of the switch underlies a tear seam in the cover. When the air bag inflates, the rupturable portion of the switch tears to enable the switch parts to separate so that the air bag can inflate out of the cover.

SUMMARY OF THE INVENTION

The present invention is an apparatus for covering an inflatable vehicle occupant protection device. The apparatus comprises a cover having a rupturable tear seam defining first and second portions of the cover. The tear seam has a base portion disposed between and releasably joining the first and second cover portions to enable movement at least one of the first and second cover portions from a closed condition to an open condition upon inflation of the inflatable device. The apparatus also includes a switch assembly in an electric circuit for actuating an electrically actuatable device of the vehicle. The switch assembly includes a first switch member underlying the first cover portion and a second switch member underlying the second cover portion. At least one of the first and second switch members is movable with the at least one of the first and second cover portions. The second switch member has a predetermined weakened portion underlying the second cover portion. The first cover portion is manually engageable to operate the first switch member to actuate the electrically actuatable device, and the second cover portion is manually engageable to operate the second switch member to actuate the electrically actuatable device.

The switch assembly includes a non-rupturing connector member extending across the tear seam and electrically interconnecting the first switch member and the second switch member. The connector member is connected with the second switch member adjacent to the predetermined weakened portion. The predetermined weakened portion is rupturable due to force applied by the connector member upon inflation of the inflatable device.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENTS

Figure 1:
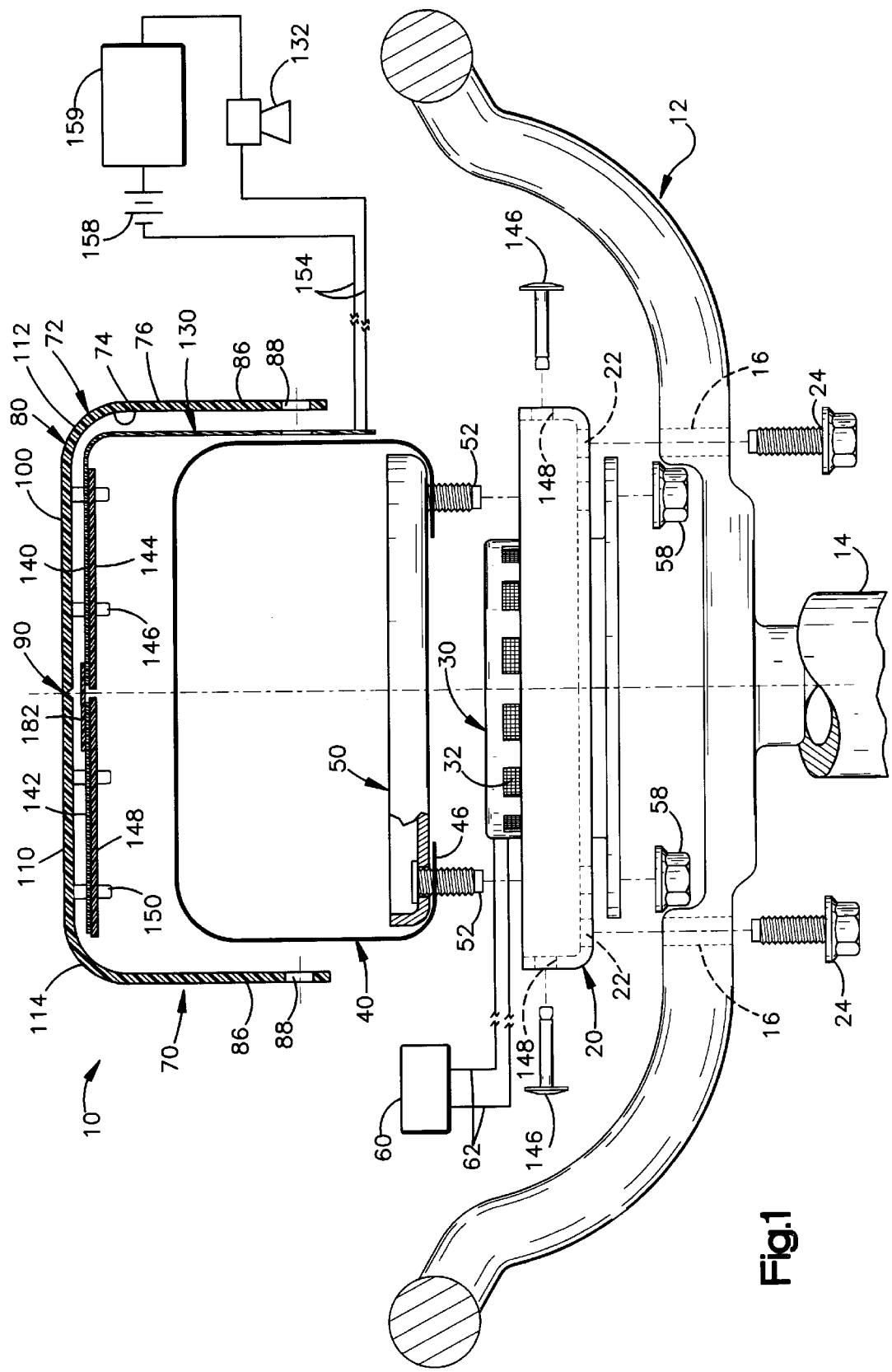
FIG. 1 is a schematic view, partially in section, showing a horn switch as part of an air bag module mounted on a vehicle steering wheel.

The present invention relates to a vehicle safety apparatus including a switch. In particular, the present invention relates to an air bag module which includes a switch for an electrically actuatable device of the vehicle, such as a vehicle horn. As representative of the present invention, FIG. 1 illustrates an air bag module 10.

The air bag module 10 is mounted on a vehicle steering wheel, a portion of which is shown at 12. The steering wheel 12 is supported on a steering shaft or steering column of the vehicle indicated schematically at 14. A plurality of fastener openings 16 are formed in the steering wheel 12.

The air bag module 10 includes a support or base plate 20 which is preferably made from steel or aluminum. A plurality of fastener openings 22 are spaced apart around the periphery of the base plate 20. A plurality of bolts 24 extend through the fastener openings 16 in the steering wheel 12 and are screwed into the fastener openings 22 in the base plate 20. The bolts 24 secure the base plate 20 to the steering wheel 12.

The air bag module 10 includes an inflator 30 which is supported in a known manner (not shown) on the base plate 20. The inflator 30 has one or more fluid outlets 32 for directing inflation fluid into an air bag 40 upon actuation of the inflator. The inflator 30 is illustrated as a pyrotechnic inflator which uses the combustion of gas-generating material to generate inflation fluid in the form of gas to inflate the air bag 40. The module 10 alternatively could include an inflator which contains a stored quantity of pressurized inflation fluid, or a combination of pressurized inflation fluid and ignitable material for heating the inflation fluid.

The air bag 40 is illustrated schematically in a deflated, packed condition in FIG. 1. The air bag 40 is preferably made from a fabric material such as woven nylon. The air bag 40 can alternatively be made from non-woven material, such as plastic film. The use of plastic film, in particular, would require inflation fluid vents to be formed in the air bag 40, as is known in the art.

The module 10 includes a retaining ring 50 from which extend a plurality of fasteners 52, such as weld studs. The fasteners 52 on the retaining ring 50 extend through openings in an end portion 46 of the air bag 40. The retaining ring 50 is secured to the base plate 20 by nuts 58 screwed onto the fasteners 52. The end portion 46 of the air bag 40 is clamped between the retaining ring 50 and the base plate 20. As a result, the air bag 40 is secured in position on the vehicle steering wheel 12, adjacent to the inflator 30.

The vehicle includes known means 60 for sensing a collision involving the vehicle and for actuating the inflator 30 in response to the sensing of a collision. The means 60 may include a deceleration sensor and vehicle electric circuitry for actuating the inflator 30 in response to sensing a vehicle deceleration indicative of a vehicle collision having a severity greater than a predetermined threshold value.

As discussed below, the means 60 provides an electric signal over lead wires 62 to the inflator 30, when the inflator is to be actuated.

The air bag module 10 includes a cover 70 for enclosing the air bag 40 and the inflator 30. The cover 70 is made from a material which is strong enough to protect the parts of the air bag module 10 which are enclosed within the cover. The material of the cover 70 is sufficiently flexible or deformable so that it can be resiliently deformed inwardly (that is, in a downward direction as viewed in FIG. 1) by pressure from an occupant of the vehicle, so as to actuate an electrical device of the vehicle such as the vehicle horn.

The cover 70 has a main body portion 72 which has inner and outer side surfaces 74 and 76. The main body portion 72 of the cover 70 includes a fixed part 80 of the cover. A mounting flange or mounting portion 86 of the cover 70 extends from the main body portion 72 in a direction toward the base plate 20. A plurality of first fastener openings 88 are formed in the mounting portion 86 of the cover 70.

An I-shaped tear seam 90 (FIG. 2) is formed in the main body portion 72 of the cover 70. The tear seam 90 includes a central section 92 and four side sections 94, 96, 98 and 102. The tear seam 90 constitutes a weakened portion of the cover 70 which is rupturable under the force of the inflating air bag 40 to enable the air bag to inflate out of the cover. The tear seam 90 partially defines first and second movable parts 100 and 110 of the cover.

Each one of the first and second movable cover parts 100 and 110 has a generally rectangular configuration. The base 92 and the side sections 94 and 96 of the tear seam 90 extend along three sides of the first movable cover part 100. A first hinge portion 112 of the cover 70 extends along the fourth side of the first movable cover part 100, between the two side sections 94 and 96 of the tear seam 90. The first hinge portion 112 connects the first movable cover part 100 to the fixed cover part 80 for pivotal movement relative to the fixed cover part.

The base 92 and the other two side sections 98 and 102 of the tear seam 90 extend along three sides of the second movable cover part 110. A second hinge portion 114 of the cover 70 extends along the fourth side of the second movable cover part 110, between the two side sections 98 and 102 of the tear seam 90. The second hinge portion 114 connects the second movable cover part 110 to the fixed cover part 80 for pivotal movement relative to the fixed cover part.

The air bag module 10 includes a switch assembly or switch 130 for actuating an electrically actuatable device of the vehicle, such as a vehicle horn indicated schematically at 132 (FIG. 1). In the preferred embodiment, the switch 130 is a flexible membrane switch of a known type which includes first and second layers of electrically conductive material (not shown) normally separated by a dielectric material. The dielectric material is preferably a layer of Mylar brand plastic on opposite sides of which the layers of electrically conductive material are formed.

The layers of conductive material are engageable with each other, in response to the application of force to the switch 130, to change the resistance of the switch. The first or positive layer of electrically conductive material is located on the side of the switch 130 above the plane of the paper as viewed in FIG. 2. The second or negative layer of electrically conductive material is located on the side of the switch 130 below the plane of the paper as viewed in FIG. 2.

The switch 130 includes first and second active switch parts or actuator pads 140 and 142. The first actuator pad 140 is mounted with a first back plate 144 at a position underlying the first movable cover part 100. The first actuator pad 140 is located between the first back plate 144 and the inner side surface of the first movable cover part 100. A plurality of pins 146 which extend inward from the first movable cover part 100 secure the first back plate 144 and the first actuator pad 140 to the first movable cover part. The first back plate 144 provides a relatively rigid support for the first actuator pad 140, so that force applied to the first cover part 100 can result in operation of the first actuator pad of the switch 130. The first back plate 144 and the first actuator pad 140 are movable with the first movable cover part 100. (The spacing between the first movable cover part 100, the first actuator pad 140, and the first back plate 144 is exaggerated, for clarity, in FIG. 1.)

A pair of lead wires 154 or other known type of electrical conductor are electrically connected with the first actuator pad 140. The lead wires 154 are preferably formed as layers of conductive material on a flexible substrate 155. The flexible substrate 155 may be formed as one piece with the dielectric substrate material of the first actuator pad 140. The lead wires 154 extend from the first actuator pad 140, across the first hinge portion 112 of the cover 70, and into a position underlying the fixed portion 80 of the cover. The lead wires 154 connect the switch assembly 130 with the vehicle horn 132, with a power source 158 such as the vehicle battery, and with vehicle electric circuitry indicated schematically at 160.

The second actuator pad 142 is mounted with a second back plate 148 at a position underlying the second movable cover part 110. The second actuator pad 142 is located between the second back plate 148 and the inner side surface of the second movable cover part 110. A plurality of pins 150 which extend inward from the second movable cover part 110 secure the second back plate 148 and the second actuator pad 142 to the second movable cover part. The second back plate 148 provides a relatively rigid support for the second actuator pad 142, so that force applied to the second cover part 110 can result in operation of the second actuator pad of the switch 130. The second back plate 148 and the second actuator pad 142 are movable with the second movable cover part 110.

The second actuator pad 142 has a first predetermined weakened portion 160. The predetermined weakened portion 160 is disposed adjacent to an edge 162 of the second actuator pad 142. The edge 162 is disposed adjacent to the base portion 92 of the tear seam 90 and is presented toward the first actuator pad 140. The predetermined weakened portion 160 underlies the second movable cover portion 110 and does not underlie the tear seam 90.

A shear line 164 extending through the second actuator pad 142 defines the predetermined weakened portion 160 of the second actuator pad 142. In the illustrated embodiment, the shear line 164 is formed as a series of perforations which extend through the material of the second actuator pad 142 at spaced locations along the length of the shear line. Alternatively, the shear line 164 can be a single cut line which extends through the material of the second actuator pad 142 for the entire length of the shear line.

The shear line 164 has a C-shaped configuration which includes a base portion 166 spaced apart from the edge 162 of the second actuator pad 142. The C-shaped configuration also includes two arm portions 168 and 169 which extend from the base portion 166 in a direction toward the edge 162 of the second actuator pad. The arm portions 168 and 169 of the shear line 160 terminate at locations spaced apart from the edge 162.

The second actuator pad 142 also has a second predetermined weakened portion 170. The second predetermined weakened portion 170 is spaced apart from the first predetermined weakened portion 160 along the edge 162 of the second actuator pad 142. The second predetermined weakened portion 170 is identical in formation and configuration to the first predetermined weakened portion 160.

The second predetermined weakened portion 170 is defined by a second shear line 174 which has a C-shaped configuration identical to that of the first shear line 164. The second shear line 174 is spaced apart from the edge 162 of the second actuator pad 142. The second predetermined weakened portion 170 thus underlies the second movable cover portion 110 and does not underlie the tear seam 90.

The first and second actuator pads 140 and 142 are electrically interconnected by a connector member or connector section 180 of the switch 130. The connector section 180 of the switch 130 includes two connector ribbons 182 and 184 which extend across the central or base portion 92 of the tear seam 90.

Figure 3:
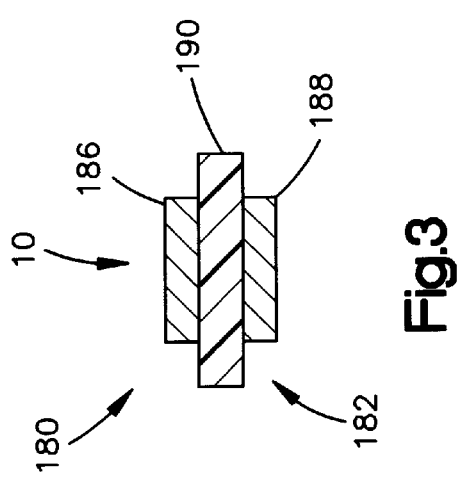
FIG. 3 is a sectional view of a connector ribbon which forms a part of the horn switch of FIG. 1.

The first connector ribbon 182 includes a positive conductive lead 186 and a negative conductive lead 188 (FIG. 3) disposed on opposite sides of a flexible substrate 190. The flexible substrate 190 may be made from the same material as the substrates of the first and second actuator pads 140 and 142. The conductive leads 186 and 188 are preferably made from copper. The first connector ribbon 182 is connected with the second actuator pad 142 adjacent to the first predetermined weakened portion 160 of the second actuator pad. Specifically, the first connector ribbon 182 is connected with the second actuator pad 142 at a location between the arms 168 and 169 of the shear line 164.

The positive lead 186 on the first connector ribbon 182 is electrically connected, in a known manner (not shown), with the positive layer of the first actuator pad 140 and with the positive layer of the second actuator pad 142. The negative lead 188 on the ribbon 182 is electrically connected, in a known manner (not shown), with the negative layer of the first actuator pad 140 and with the negative layer of the second actuator pad 142.

The second connector ribbon 184 is identical in configuration to the first connector ribbon 182. The second connector ribbon 184 is connected with the second actuator pad 142 adjacent to the second predetermined weakened portion 170 of the second actuator pad. Specifically, the second connector ribbon 184 is connected with the second actuator pad 142 at a location between the arms of the C-shaped shear line 174.

Figure 2:
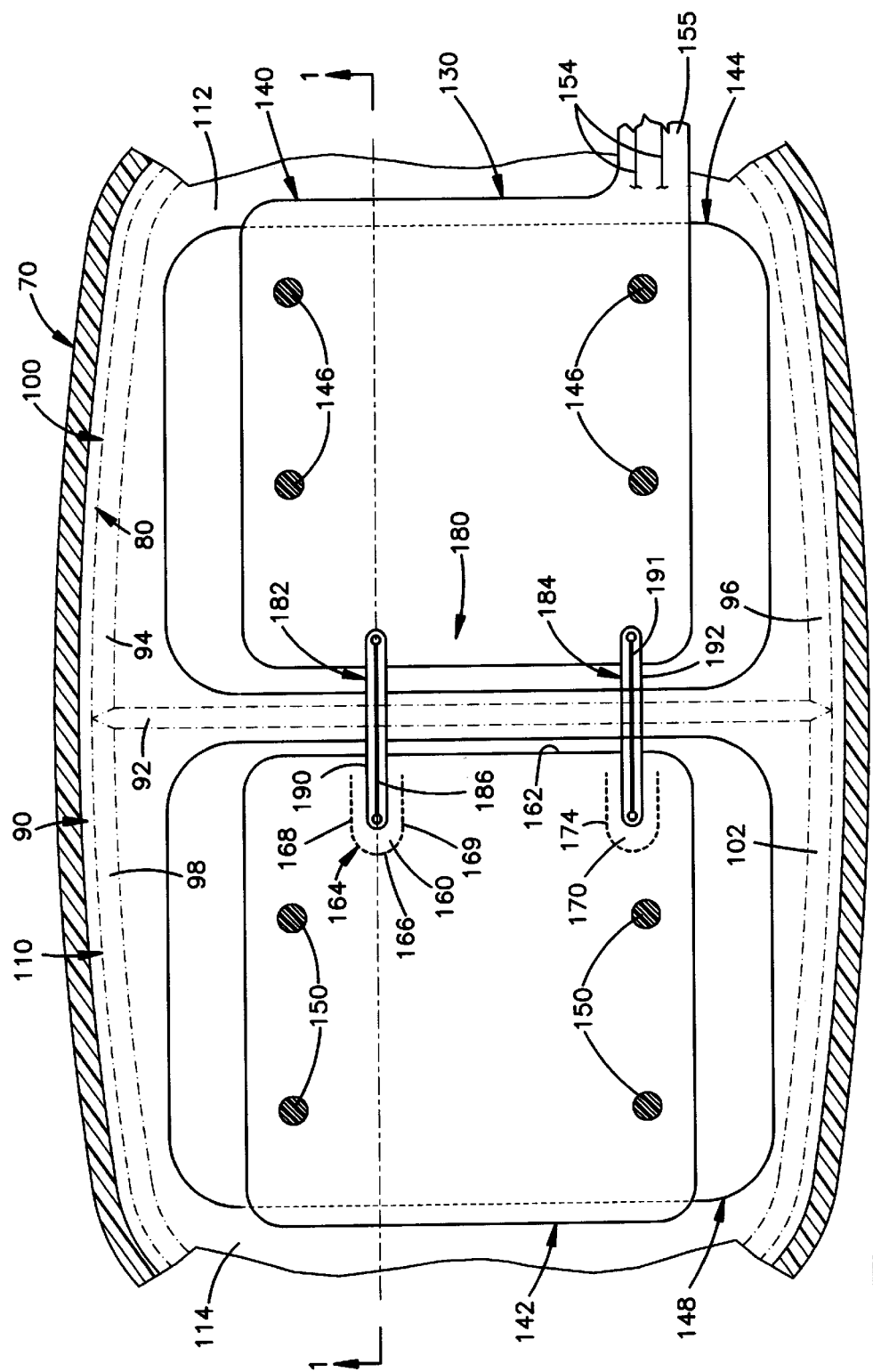
FIG. 2 is a schematic plan view of portions of the air bag module of FIG. 1.

The second connector ribbon 184 includes a pair of conductive leads (only the positive lead 191 is shown in FIG. 2) on opposite sides of a substrate 192. The positive lead 191 on the second connector ribbon 184 is electrically connected, in a known manner, with the positive layer of the first actuator pad 140 and with the positive layer of the second actuator pad 142. The negative lead (not shown) on the second connector ribbon 184 is electrically connected, in a known manner, with the negative layer of the first actuator pad 140 and with the negative layer of the second actuator pad 142.

To effect operation of the vehicle horn 132, the driver of the vehicle presses on the cover 70 of the air bag module 10 in a downward direction as viewed in FIG. 1. The force applied to the cover 70 of the air bag module 10 is transmitted through the cover to the switch 130. Specifically, force applied to the first movable cover part 100 is transmitted to the first actuator pad 140. The first actuator pad 140 is operated, and the vehicle horn 132 is energized. When force is applied to the second actuator pad 142, the force is transmitted to the second movable cover part 110, the second actuator pad is operated, and the vehicle horn 132 is energized.

When the force on the cover 70 of the air bag module 10 is released, the resilience of the cover causes it to move away from the air bag 40. As this movement occurs, the switch 130 returns to its original condition. This change in the condition of the switch 130 is sensed by the vehicle electric circuitry 159, and the vehicle horn 132 is de-energized.

In the event of an impact to the vehicle of a magnitude greater than the predetermined threshold value, the sensing means 60 provides an electrical signal over the wires 62 to the inflator 30. The inflator 30 is actuated in a known manner. Inflation fluid flows out of he inflator 30 through the fluid outlets 32 and into the air bag 40. The rapidly flowing inflation fluid causes the air bag 40 to inflate in an upward direction as viewed in FIG. 1.

The force of the inflating air bag 40 is applied against the inside of the switch 130 and the cover 70. Specifically, the inflating air bag 40 pushes outward against the first and second back plates 144 and 148 and against the inner side surface 74 of the cover 70. The cover 70 opens along the I-shaped tear seam 90, which is the predetermined weakened portion of the cover. The first and second movable cover parts 100 and 110 move away from each other, pivoting about the hinge portions 112 and 114, respectively, into an open condition (not shown). The cover 70 opens sufficiently that the air bag 40 inflates between the first and second movable cover parts 100 and 110 into a position to help protect the vehicle occupant.

When the cover 70 moves to the open condition, the first actuator pad 140 moves with the first movable cover part 100 and the second actuator pad 142 moves with the second movable cover part 110. The actuator pads 140 and 142 swing apart, pivoting about the hinge portions 112 and 114, respectively, of the cover 70. This relative movement between the actuator pads 140 and 142 applies a tensile stress to the first and second connector ribbons 182 and 184.

Figure 4:
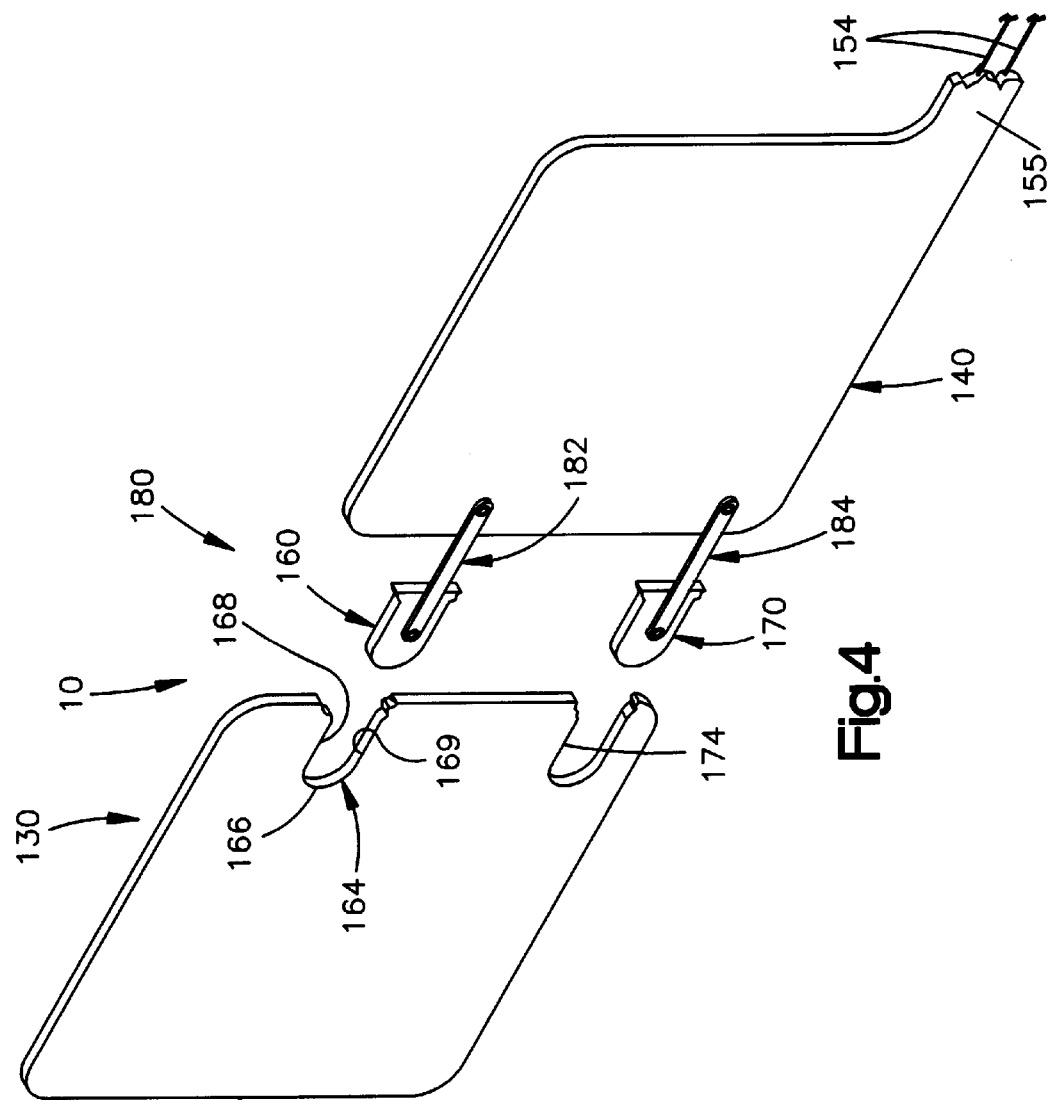
FIG. 4 is a schematic view illustrating the rupturing of the horn switch upon inflation of the air bag.

The connector ribbons 182 and 184 do not break or rupture as the cover 70 opens. Instead, the force applied to the connector ribbons 182 and 184 of the switch 130 is transmitted to the predetermined weakened portions 160 and 170, respectively, of the second actuator pad 142. The weakened portions 160 and 170 of the second actuator pad 142 rupture, as shown schematically in FIG. 4.

Specifically, the second actuator pad 142 tears along the shear line 164. The material of the second actuator pad 142 also tears along two lines extending roughly between the ends of the shear line arm portions 168 and 169 and the edge 162 of the second actuator pad. A D-shaped section of the second actuator pad 142 is torn off and moves with the first connector ribbon 180. Similarly, another D-shaped section of the second actuator pad 142 is torn off at the second shear line 174 and moves with the second connector ribbon 184.

The rupturing of the weakened portions 160 and 170 of the second actuator pad 142 enables the connector ribbons 182 and 184 and the first actuator pad 140 to separate from the second actuator pad 142. The cover 70 opens, enabling inflation of the air bag 40 out of the cover into a position to help protect a vehicle occupant. movement between the actuator pads 140 and 142 applies a tensile stress to the first and second connector ribbons 182 and 184.

The connector ribbons 182 and 184 do not break or rupture as the cover 70 opens. Instead, the force applied to the connector ribbons 182 and 184 of the switch 130 is transmitted to the predetermined weakened portions 160 and 170, respectively, of the second actuator pad 142. The weakened portions 160 and 170 of the second actuator pad 142 rupture, as shown schematically in FIG. 4.

Specifically, the second actuator pad 142 tears along the shear line 164. The material of the second actuator pad 142 also tears along two lines extending roughly between the ends of the shear line arm portions 168 and 169 and the edge 162 of the second actuator pad. A D-shaped section of the second actuator pad 142 is torn off and moves with the first connector ribbon 180. Similarly, another D-shaped section of the second actuator pad 142 is torn off at the second shear line 174 and moves with the second connector ribbon 184.

The rupturing of the weakened portions 160 and 170 of the second actuator pad 142 enables the connector ribbons 182 and 184 and the first actuator pad 140 to separate from the second actuator pad 142. The cover 70 opens, enabling inflation of the air bag 40 out of the cover into a position to help protect a vehicle occupant.

The switch 130 can be used to actuate an electrically actuatable device of the vehicle other than the vehicle horn 132. For example, the switch 130 could be used to actuate or control the vehicle radio, speed control, etc. Alternatively, the switch 130 could have a plurality of electrically independent active areas for controlling a plurality of electrically actuatable devices including the vehicle horn 132.

From the above description of the invention, those skilled in the art will perceive improvements, changes and modifications. For example, the present invention is not limited to an air bag module which is mounted on a vehicle steering wheel. The present invention can be used with an air bag module mounted on a vehicle instrument panel, a vehicle seat or door panel, or other portion of the vehicle. Such improvements, changes and modifications within the skill of the art are intended to be covered by the appended claims.

Having described the invention, I claim:

1. An apparatus for covering an inflatable vehicle occupant protection device, comprising:

a cover having a rupturable tear seam defining first and second portions of said cover, said tear seam having a base portion disposed between and releasably joining said first and second cover portions to enable movement of at least one of said first and second cover portions from a closed condition to an open condition upon inflation of the inflatable device; and a switch assembly in an electric circuit for actuating an electrically actuatable device of the vehicle, said switch assembly including a first switch member underlying said first cover portion and a second switch member underlying said second cover portion, at least one of said first and second switch members being movable with said at least one of said first and second cover portions, said second switch member having a predetermined weakened portion entirely underlying said second cover portion and spaced laterally apart from said tear seam;

said first cover portion being manually engageable to operate said first switch member to actuate said electrically actuatable device, said second cover portion being manually engageable to operate said second switch member to actuate said electrically actuatable device;

said switch assembly including a non-rupturing connector member extending across said tear seam and electrically interconnecting said first switch member and said second switch member;

said connector member being connected with said second switch member adjacent to said predetermined weakened portion, said predetermined weakened portion being rupturable due to force applied by said connector member upon inflation of the inflatable device.

2. An apparatus as set forth in claim 1 wherein said tear seam has an I-shaped configuration, each one of said first and second cover portions being movable and having a generally rectangular configuration defined by three portions of said tear seam and a respective hinge portion of said cover.

3. An apparatus as set forth in claim 1 wherein said connector member comprises a pair of conductive leads on a flexible substrate material.

4. An apparatus as set forth in claim 1 wherein said second switch member has a shear line extending through said second switch member and defining said predetermined weakened portion of said second switch member.

5. An apparatus as set forth in claim 4 wherein said shear line has a C-shaped configuration.

6. An apparatus as set forth in claim 4 wherein said shear line extends completely through the material of said second switch member for the entire length of said shear line.

7. An apparatus as set forth in claim 4 wherein said shear line comprises a series of perforations which extend through the material of said second switch member along the length of said shear line.

8. An apparatus as set forth in claim 4 wherein said second switch member has an edge disposed adjacent to said base portion of said tear seam, said shear line including a base portion spaced apart from said edge of said second switch member, said shear line including two arm portions which extend from said base portion in a direction toward said edge of said second switch member and which terminate at locations spaced apart from said edge portion.

9. An apparatus as set forth in claim 1 wherein said second switch member has two shear lines, said connector member comprising two connector ribbons connected with said second switch member adjacent to said shear lines.

10. An apparatus as set forth in claim 1 wherein said predetermined weakened portion comprises at least one section of said second switch member which is torn off by said connector member and which moves with said connector member upon inflation of the inflatable device.

* * * * *